United States Patent
Zehler

(10) Patent No.: US 10,931,666 B2
(45) Date of Patent: Feb. 23, 2021

(54) METHOD AND APPARATUS FOR AUTOMATICALLY CONNECTING A MOBILE DEVICE AND AN OUTPUT DEVICE

(71) Applicant: Xerox Corporation, Norwalk, CT (US)

(72) Inventor: Peter J. Zehler, Penfield, NJ (US)

(73) Assignee: Xerox Corporation, Norwalk, CT (US)

( * ) Notice: Subject to any disclaimer, the term of this patent is extended or adjusted under 35 U.S.C. 154(b) by 367 days.

(21) Appl. No.: 15/939,117

(22) Filed: Mar. 28, 2018

(65) Prior Publication Data

US 2019/0306160 A1 Oct. 3, 2019

(51) Int. Cl.
| | |
|---|---|
| H04L 29/06 | (2006.01) |
| G06F 21/60 | (2013.01) |
| G06F 3/12 | (2006.01) |
| H04W 12/06 | (2021.01) |

(52) U.S. Cl.
CPC ........ H04L 63/0853 (2013.01); G06F 3/1285 (2013.01); G06F 3/1292 (2013.01); G06F 21/608 (2013.01); H04L 63/0838 (2013.01); H04W 12/06 (2013.01)

(58) Field of Classification Search
None
See application file for complete search history.

(56) References Cited

U.S. PATENT DOCUMENTS

| | | | | |
|---|---|---|---|---|
| 8,134,831 B1 * | 3/2012 | Hernandez | ............ | G06F 1/1616 361/679.55 |
| 9,374,656 B2 | 6/2016 | Reitz | | |
| 9,805,370 B1 * | 10/2017 | Quigley | ............. | G06Q 20/3278 |
| 9,985,786 B1 * | 5/2018 | Bhabbur | ................ | G06F 3/0488 |
| 2007/0244811 A1 * | 10/2007 | Tumminaro | ........... | G06Q 30/06 705/39 |
| 2010/0094925 A1 * | 4/2010 | St Jacques, Jr. | ... | H04N 21/4788 709/202 |
| 2011/0197271 A1 * | 8/2011 | Buck | ..................... | G06F 3/1267 726/9 |
| 2015/0089568 A1 * | 3/2015 | Sprague | .................. | H04L 63/06 726/1 |

(Continued)

OTHER PUBLICATIONS

Singh, Akhilesh et al. Secure Swipe Machine with Help of Biometric Security. 2016 International Conference on Electrical, Electronics, and Optimization Techniques (ICEEOT). https://ieeexplore.ieee.org/stamp/stamp.jsp?tp=&arnumber=7754847 (Year: 2016).*

(Continued)

*Primary Examiner* — Jeremiah L Avery

(57) ABSTRACT

A method, non-transitory computer readable medium, and apparatus for connecting a mobile device with an output device are disclosed. The method may be performed by a processor of a pairing server. For example, the method receives a request to connect the mobile device of an authenticated user to the output device, identifies the mobile device in a database comprising a register of authenticated users and one or more mobile devices of each one of the authenticated users, and transmits a configuration information and a connection information to the mobile device, wherein the configuration information causes the mobile device to modify a configuration of the mobile device and automatically connect to the output device based on the connection information.

16 Claims, 4 Drawing Sheets

(56) References Cited

U.S. PATENT DOCUMENTS

2017/0308889 A1* 10/2017 Cameron ................ G07F 17/18

OTHER PUBLICATIONS

Dutta, Mithun et al. ATM Card Security Using Bio-metric and Message Authentication Technology. 2018 IEEE International Conference on Computer and Communication Engineering Technology (CCET). https://ieeexplore.ieee.org/stamp/stamp.jsp?tp=& arnumber= 8542227 (Year: 2018).*

* cited by examiner

METHOD AND APPARATUS FOR AUTOMATICALLY CONNECTING A MOBILE DEVICE AND AN OUTPUT DEVICE

The present disclosure relates generally to pairing devices and, more particularly, to a method and an apparatus for automatically pairing and connecting a mobile device and an output device.

BACKGROUND

A user typically operates an output device using a user interface (UI) located at the output device. Resources and applications available at the local user interface and accessible from the output device are either located locally on the output device or on remote servers. In some instances, a user may use more than one output device and, therefore, the management of locally stored resources and applications on multiple machines may become cumbersome. In the case of resources and applications that rely on remote servers, security may be an issue as most servers may be outside of the user's control.

Operation of the output device is typically based on resources available locally on the output device. The output device may have some local memory that stores addresses and information. A document may be scanned and the document can be transmitted to an address selected from the local memory. Thus, the functions performed by the output device may be limited to information stored in the local memory or the user may be required to manually input other addresses or information.

In some instances, it may be convenient to interact with the output device using a mobile device (for example, printing documents and images stored on a smartphone). However, the communication pathway between the mobile device and output device may not be secure since the communication pathway may involve networks, servers, and devices outside the user's control. This makes the communication susceptible to man-in-the-middle (MITM) attacks. Furthermore, manually pairing and configuring a secure communication pathway between the output device and the mobile device may be overly complicated or may involve many blocks.

SUMMARY

According to aspects illustrated herein, there are provided a method, a non-transitory computer readable medium, and an apparatus for connecting a mobile device with an output device. One disclosed feature of the embodiments is a method that is performed by a processor of a pairing server. The method receives a request to connect the mobile device of an authenticated user to the output device, identifies the mobile device in a database comprising a register of authenticated users and one or more mobile devices of each one of the authenticated users, and transmits a configuration information and a connection information to the mobile device, wherein the configuration information causes the mobile device to modify a configuration of the mobile device and automatically connect to the output device based on the connection information.

Another disclosed feature of the embodiments is a non-transitory computer-readable medium having stored thereon a plurality of instructions, the plurality of instructions including instructions which, when executed by a processor, cause the processor to perform a method that receives a request to connect the mobile device of an authenticated user to the output device, identifies the mobile device in a database comprising a register of authenticated users and one or more mobile devices of each one of the authenticated users, and transmits a configuration information and a connection information to the mobile device, wherein the configuration information causes the mobile device to modify a configuration of the mobile device and automatically connect to the output device based on the connection information.

Another disclosed feature of the embodiments is an apparatus comprising a processor that is configured to receive a request to connect the mobile device of an authenticated user to the output device, identify the mobile device in a database comprising a register of authenticated users and one or more mobile devices of each one of the authenticated users, and transmit a configuration information and a connection information to the mobile device, wherein the configuration information causes the mobile device to modify a configuration of the mobile device and automatically connect to the output device based on the connection information.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for connecting a mobile device and an output device. As discussed above, operation of the output device is typically based on resources available locally on the output device. The output device may have some local memory that stores addresses and information. A document may be scanned and the document can be transmitted to an address selected from the local memory. Thus, the functions performed by the output device may be limited to information stored in the local memory or the user may be required to manually input other addresses or information.

In addition, operation of the output device based on input at the mobile device user interface can provide a convenient mechanism for processing documents (for example, printing documents and images stored on a smartphone). However, the communication pathway between the mobile device and output device may not be secure since the communication pathway may involve networks, servers, and devices outside the user's control. This makes the communication susceptible to man-in-the-middle (MITM) attacks. Furthermore, manually pairing and configuring a secure communication pathway between the output device and the mobile device may be overly complicated or may involve many blocks.

One embodiment of the present disclosure automatically connects a mobile device of a user with an output device via an external card used for authentication. An external card swipe at the output device may initiate the pairing and connection between the mobile device and the output device. The mobile device is to remain a passive device in the connection process. The output device may collect the credentials of the user to initiate an authentication of the user. After the user is authenticated, a pairing server may identify mobile devices associated with the user and send configuration and connection information to the mobile device of the user. The mobile device may then directly connect to the output device based on the configuration and connection information that is received.

After the connection is established the output device may have access to resources on the mobile device. For example, the output device may access contact information stored on the mobile device and allow a user to select a contact at the UI of the output device that is found in the memory of the mobile device. In other examples, a user may select a document stored on the mobile device to be printed on the output device via the UI of the output device. Thus, the connection provides a more personalized experience for the user at the output device.

In addition, the connection may allow the mobile device to be used to control the output device. The mobile device may be configured or customized to also provide a more personalized experience of the output device for the user.

Figure 1:
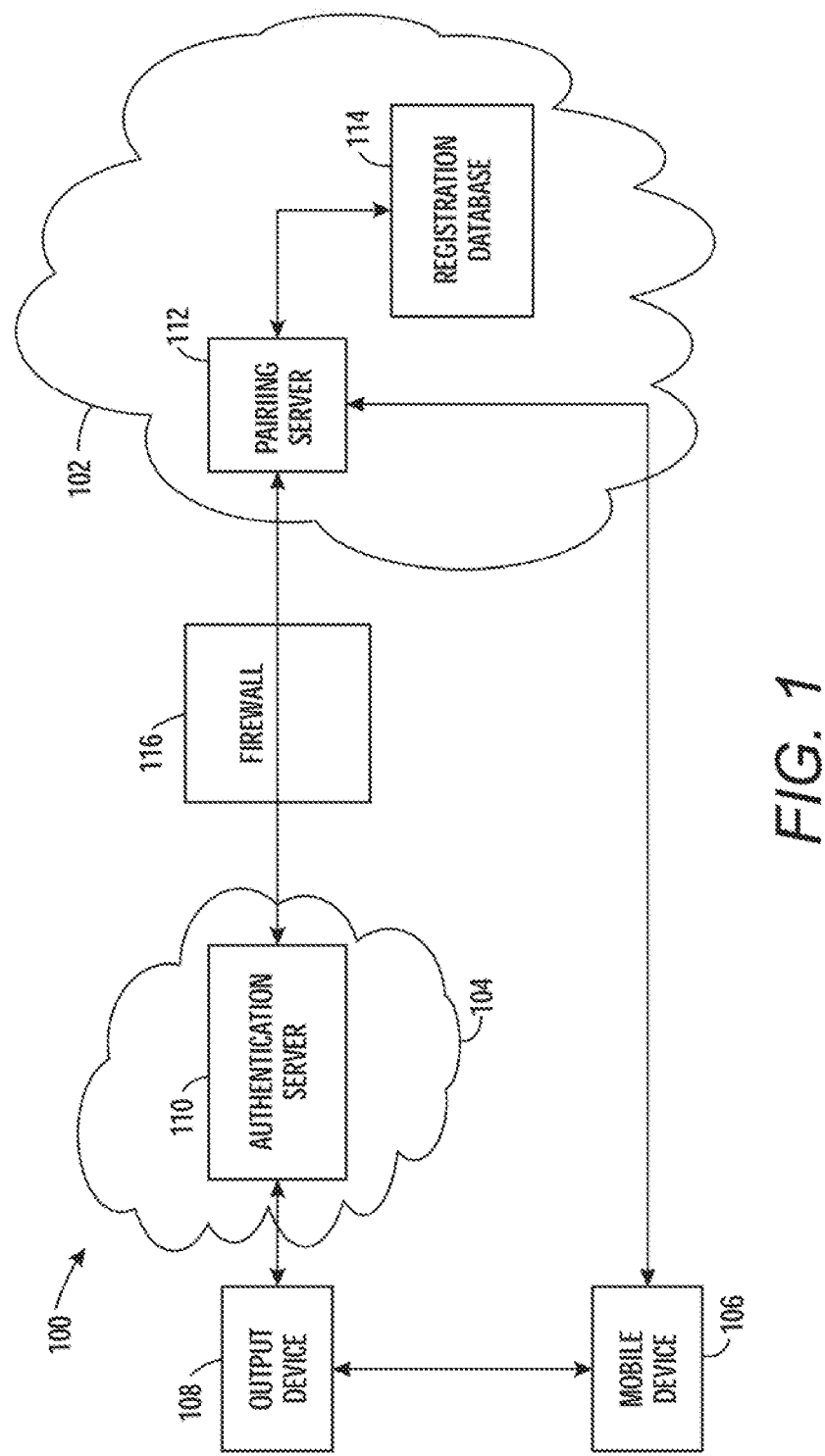
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102 and a local area network (LAN) 104. The IP network 102 may provide a remote path for communication with a mobile device 106. The IP network 102 may be, for example, a cellular communication network, the Internet, a service provider network, an access network, a core network, and the like.

In one embodiment, the IP network 102 may include a pairing server 112. In one embodiment, the pairing server 112 may access a registration database 114 or memory for storing registration of one or more mobile devices, registration of one or more authentication servers 110, one or more communication protocols for communicating with the mobile devices 106, one or more communication protocols for communicating with the authentication servers 110, and the like.

In one embodiment, the registration database 114 may include a register that includes an identification of users and one or more mobile devices that are associated with the each identified user. The register may include contact information for each mobile device. In one embodiment, the contact information may include a telephone number to text information, an email address to email information, a media access control identification (ID) number to transmit information wireless (e.g., over a local Wi-Fi network, a Bluetooth connection, and the like), or any other type of contact information associated with the mobile device.

In one embodiment, the registration database 114 may also store a configuration information and a connection information for each mobile device. For example, mobile devices may be built as different models. The different models of mobile devices may operate with different operating systems, different communication protocols, different configuration settings, and the like. This may be one reason why it may be difficult for a user to try and connect a mobile device 106 to the output device 108 manually. Thus, the registration database 114 may have the correct configuration information and the correct connection information for each mobile device based on the model of the mobile device.

In one embodiment, a user may register a mobile device 106 in the registration database 114 via mobile print extensible interface platform (EIP), a web portal, a mobile application, and the like. The user may provide the data described above for each mobile device 106, or some of the data described above and the other data may be entered automatically based on a model number of the mobile device 106. A registration identification may be sent to the mobile device 106 that includes a link to a software client to install on the mobile device 106. The software application may be used in connection with information received from the pairing sever 112, as discussed in further details below. Once the software application is downloaded and installed on the mobile device 106, the mobile device 106 may be registered in the registration database 114 and ready to be automatically connected to the output device, as discussed herein.

As will be discussed in further details below, the configuration information and the connection information may cause the mobile device 106 to automatically configure itself to connect to the output device 108. In one embodiment, the configuration information may include executable instructions that cause the mobile device 106 to automatically perform modifications on the mobile device 106. For example, the configuration may include executable instructions to customize a graphical user interface of the mobile device 106 to control the output device 108. For example, different mobile devices may have different screen sizes. As a result, the configuration information may include the desired buttons and/or arrangement of buttons that are displayed on the graphical user interface (GUI) of the mobile device to control the output device. The configuration may include executable instructions on how the buttons in the GUI appear, which functions should be displayed as buttons or in a drop down menu, and the like.

The configuration information may also include executable instructions to modify at least one communication parameter on the mobile device 106 to establish a connection between the mobile device 106 and the output device 108. In one embodiment, the communication information may identify a network that may be used for the connection. For example, the network may identify a type of network and the associated information. Examples may include a Wi-Fi network with the name and password for the Wi-Fi network, a Bluetooth connection and information associated with the Bluetooth connection, another type of low energy connection, and the like. For example, the communication parameter may include information such as a network address or name, a virtual address, and the like of the output device 108, identification of port numbers and values for each port, firewall information, and the like.

In one embodiment, the connection information may include a communication protocol for the mobile device 106 to follow to establish a connection between the mobile device 106 and the output device 108. For example, different models of mobile devices may use different communication protocols. The connection information may include instructions that are formatted in a protocol language that is used by the model of the mobile device.

In one embodiment, the pairing server 112 may be embodied as a general computing device as described below and illustrated in FIG. 4. Although only a single pairing server 112 is illustrated in FIG. 1, it should be noted that any number of pairing servers may be deployed. In addition, multiple pairing servers may be located together or distributed across different geographic locations. Although the pairing server 112 is illustrated as being in the IP network 102, the pairing server 112 may be in communication with the IP network 102, but located outside of the IP network 102.

The LAN 104 may be a Wi-Fi network, a personal area network (PAN), and the like. In one embodiment, the LAN 104 may include an authentication server 110. In one embodiment, the authentication server 110 may include a database or memory for storing authentication credentials of a user. The output device 108 may transmit authentication credentials received from a user via a card swipe to the authentication server 110. The authentication server 110 may then determine whether the user has is authenticated based on a match of the authentication credentials. The authentication may include determining if the user may access the output device 108, when a user may have access to the authorized output device 108, what level of access the user may have to the output device 108 (for example, specific time of day), and the like. In one embodiment, the LAN 104 may provide a local path for the output device 106 to communicate with the authentication server 110.

In one embodiment, the authentication server 110 may be embodied as a general computing device as described below and illustrated in FIG. 4. Although only a single authentication server 110 is illustrated in FIG. 1, it should be noted that any number of authentication servers may be deployed. Although the authentication server 110 is illustrated as being in the LAN 104, the authentication server 110 may be in communication with the LAN 104, but located outside of the LAN 104.

As noted above, the connection process may be initiated with a card swipe at the output device 108 by a user. For example, an access card that can be used to provide authentication credentials such that a user can enter a building can also be used to provide authentication credentials to access an output device 108 (e.g., a printer, copying machine, computer, multi-function device, and the like). Any form of identifier may be used, including but not limited to magnetic card, optical identification, RFID, security token or biometric characteristics. Additionally, multiple factor authentication such as two factor authentication may be used. In one embodiment, authentication information for entitlement of services for a user of an output device 108 can be linked to registration information for the user so that the user's mobile device 106 automatically pairs the mobile device 106 of the user and the output device 108 to establish direct and secure communication between the mobile device 106 and the output device 108, as described herein. The direct connection and pairing between the mobile device 106 and the output device 108 provides a secure communication less prone to man in the middle (MITM) attacks.

In one embodiment a firewall 116 may be deployed between the LAN 104 and IP network 102 for security. It should be noted that the communication network 100 has been simplified. For example, the network 100 may include other network elements such as border elements, routers, switches, policy servers, security devices, firewalls, a content distribution network (CDN), and the like. In addition, the communication network 100 may include additional networks between the IP network 102, the LAN 104 and the mobile device 106, such as different access networks.

In one embodiment, the mobile device 106 may be in communication with the IP network 102. For example, the mobile device 106 may have cellular data capability to communicate over a cellular communication network of the IP network 102.

In one embodiment, the mobile device 106 may be in direct wireless communication with the output device 108. For example, the mobile device 106 and the output device 108 may be connected using Wi-Fi Direct, Bluetooth low energy, or any other type of local communication technology.

Although only a single mobile device 106 is illustrated, it should be noted that any number of mobile devices may be deployed. In one embodiment, the mobile device 106 may be any type of device with a graphical user interface (GUI) such as, a laptop computer, a mobile telephone, a smart phone, a tablet computer, a netbook computer, and the like. In one embodiment, the mobile device may be embodied as a general computing device discussed below and illustrated in FIG. 4.

In one embodiment, the output device 108 may be any type of output device, such as for example, a printer, a copier, a multifunction device, a fax machine, a computer, and the like. The output device 108 may be a locked device that has limited access and requires authentication of a user. For example, the output device 108 may have a local card reader or card swipe. In one embodiment, the output device 108 may be in communication with the authentication server 110 via a wired or wireless connection.

The output device 108 may have a means for inputting identification credentials (not shown). The means may comprise a numeric keypad or the touchscreen already part of the output device UI for entering a passcode. For example, the user may enter login information such as user name and password using the output device touchscreen. The identification information is communicated to the authentication server for authentication.

In addition, the means may comprise a stand-alone identification system, physically separate but located proximate to the output device (108) and in communication with the authentication server 110. For example, a biometric scanner-based system can be utilized to obtain physical characteristics of the user that will be analyzed by a biometric identification system to identify the user. The identification information is communicated to the authentication server for authentication.

In addition, the means may comprise an identification reader integrated with the output device 108. For example, a user may access the output device 108 by swiping his or her authentication card at the local card reader. The detection of the card swipe may initiate a communication from the output device 108 to the authentication server 110 to determine if a user is authorized to access the output device 108 and what level of access the user may have to the output device 108.

In one embodiment, the present disclosure leverages the card swipe to also automatically connect, or pair, the output device 108 to a mobile device 106 that is pre-registered for direct communication with the output device 108. As a result, the user need not have any a priori knowledge of any configuration information of the output device 108 or provide any information to the mobile device 106 about the output device 108.

In addition, the user may customize a software application downloaded on the mobile device 106 to directly send commands that are executed on the output device 108 and to directly access data on the output device 108. As a result, the user need not know or be familiar with the UI of the output device 108. Likewise, an administrator or user may download a software application on the output device 108 to send commands that are executed on the mobile device 106 and to access data on the mobile device 106. As a result, a user may control and access the output device 108 from whichever UI he or she is most comfortable with providing the user with a simple and satisfying user experience.

In addition, the present disclosure provides a scalable approach to providing a direct and secure connection between a mobile device 106 and an output device 108. For example, specific UIs for specific brands of output devices 108 need not be built. Rather, only a single generic software application needs to be created that is compatible with the mobile device 106 to automatically pair and establish a direct and secure communication between the mobile device 106 and the output device 108.

In addition, the secure connection allows the output device 108 to access resources of the mobile device 106. The resources may include contacts stored on the mobile device 106, documents stored on the mobile device 106, and the like. Thus, a user may use addresses (e.g., email addresses) associated with contacts stored in a memory of the mobile device 106. The secure connection may allow the output device 108 to access documents for printing or emailing as attachments stored in the memory of the mobile device 106. In other words, a user may use the UI of the output device 108 to select contacts or documents found in the mobile device 106, rather than being limited to what is stored in local memory of output device 108. Thus, the secure connection may provide a more personalized experience for the user at the output device 108.

Figure 2:
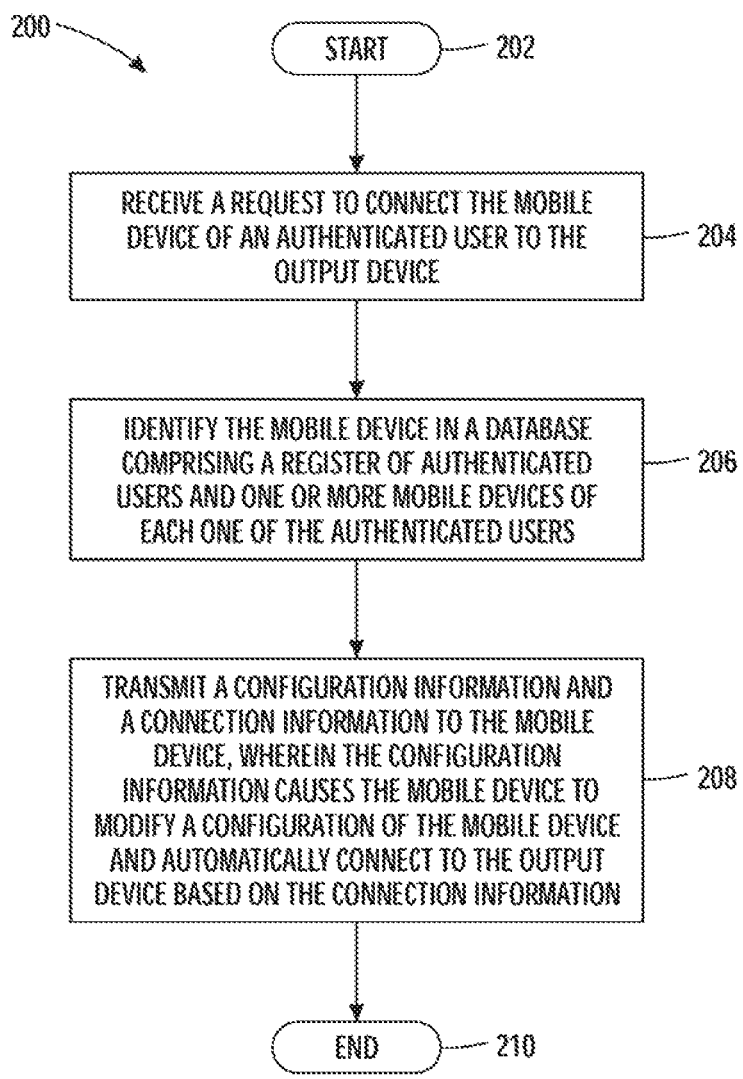
FIG. 2 illustrates an example flowchart of one embodiment of a method for connecting a mobile device and an output device.

FIG. 2 illustrates a flowchart of a method 200 for connecting a mobile device and an output device. In one embodiment, the method 200 may be performed by the pairing server 112 or a general-purpose computer as illustrated in FIG. 4 and discussed below.

The method 200 begins at block 202. At block 204, the method 200 may receive a request to connect the mobile device of an authenticated user to the output device. For example, a user may swipe a card at the output device. The card may include authentication information and the card swipe may be an indication that the user would like to connect a mobile device to the output device.

The authentication information may be transmitted to an authentication server that authenticates the user. The authentication server may be pre-registered with users that are authenticated to remotely connect to the output device. After the authentication server authenticates the user (e.g., the authentication information matches information in an entry for the user in the authentication server), the request to connect the mobile device to the output device may be received by the pairing server.

At block 206, the method 200 identifies the mobile device in a database comprising a register of authenticated users and one or more mobile devices of each one of the authenticated users. In one embodiment, the database may be a registration database, as described above. The registration database may be predefined to include one or more mobile devices that are associated with the user. The register may include an identification of each user and contact information for each mobile device.

In one embodiment, the contact information may include a telephone number to text information, an email address to email information, a media access control identification (ID) number to transmit information wireless (e.g., over a local Wi-Fi network, a Bluetooth connection, and the like), or any other type of contact information associated with the mobile device.

At block 208, the method 200 transmits a configuration information and a connection information to the mobile device, wherein the configuration information causes the mobile device to modify a configuration of the mobile device and automatically connect to the output device based on the connection information. The configuration information and the connection information may be modified by the pairing server based on a model or a type of mobile device that is used by the user. For example, different model mobile devices may have different operating systems, configuration parameters, communication protocols, and the like. Thus, based on the model of the mobile device that is identified in block 206, the pairing server may transmit the correct configuration information and the correct connection information for the model of the mobile device.

In one embodiment, the configuration information and the connection information may be stored in the register. For example, each mobile device may also include the configuration information and the connection information associated with the model of the respective mobile device. Thus, the pairing server may simply copy the information from the register in the registration database for transmission.

In one embodiment, the configuration information may include executable instructions that cause the mobile device to automatically perform modifications on the mobile device. For example, the configuration may include executable instructions to customize a graphical user interface of the mobile device to control the output device. For example, different mobile devices may have different screen sizes. As a result, the configuration information may include the desired buttons and/or arrangement of buttons that are displayed on the graphical user interface (GUI) of the mobile device to control the output device. The configuration may include executable instructions on how the buttons in the GUI appear, which functions should be displayed as buttons or in a drop down menu, and the like.

In one embodiment, a software application may be installed on the mobile device, the output device, or both, that allows the mobile device and the output device to send or receive commands or data. The software application may work with the configuration information to automatically configure itself based on the preferences of the user to provide a customized user GUI for sending or receiving commands. In other words, the software application may allow a user to access resources stored on the mobile device via a GUI on the output device, or transmit control the output device via control signals sent from the mobile device.

For example, there may be a print button on the GUI of the software application running on the mobile device that automatically sends the correct commands to the output device to print a document. In another example, there may be a "Send to my Device" button on the UI of the software application running on the output device that automatically sends the correct commands to the mobile device to transfer and save documents on the mobile device.

In another embodiment, the software application may have a GUI for sending or receiving files. For example, there may be a directory viewer on the GUI of the software application running on the mobile device that allows the user to locate a file on either the mobile device or the output device and allows the user to select the desired file for further action, such as moving, copying, or deleting files. Alternatively, there may be a directory viewer on the GUI of the software application running on the output device that allows the user to locate a file on either the mobile device or the output device and allows the user to select the desired file for further action, such as moving, copying, or deleting files.

In another embodiment, the software application may have a GUI for emailing a document scanned at the output device to a contact stored on the mobile device. For example, there may be a contact list viewer on the GUI of the software application running on the output device that allows the user to view a contacts list resource stored on the mobile device and allows the user to select desired contacts as recipients of an email containing the scanned document as an attachment.

In other words, a user may be able to, directly and securely, exchange data or commands between a mobile device and an output device without having to manually configure a direct communication connection between a mobile device and an output device and then pair the two devices.

The configuration information may also include executable instructions to modify at least one communication parameter on the mobile device to establish a connection between the mobile device and the output device. In one embodiment, the communication information may identify a network that may be used for the connection. For example, the network may identify a type of network and the associated information. Examples may include a Wi-Fi network with the name and password for the Wi-Fi network, a Bluetooth connection and information associated with the Bluetooth connection, another type of low energy connection, and the like. For example, the communication parameter may include information such as a network address or name, a virtual address, and the like, of the output device, identification of port numbers and values for each port, firewall information, and the like.

In one embodiment, the connection information may include a communication protocol for the mobile device to follow to establish a connection between the mobile device and the output device. For example, different models of mobile devices may use different communication protocols. The connection information may include instructions that are formatted in a protocol language that is used by the model of the mobile device.

With the configuration information and the connection information, the mobile device may automatically configure itself and establish a connection to the output device. Notably, no user interaction with the mobile device is required to establish the connection. In addition, the mobile device is a passive device in the connection process until the mobile device receives the configuration information and the connection information. Said another way, the mobile device does not initiate the request to connect to the output device. Rather, the request is initiated by a card swipe at the output device and the request is routed to a pairing server that transmits the necessary information to the mobile device. The information transmitted to the mobile device may cause the mobile device to automatically connect to the output device.

In one embodiment, the method 200 may also provide a secure connection. For example, the pairing server may generate a one-time token or password. The one-time token or password may be transmitted to both the output device and the mobile device. The mobile device may send the one-time token to the output device to establish the connection. If the one-time token sent by the mobile device matches the one-time token of the output device received from the pairing device, then the connection may be successfully established.

In one embodiment, each control signal sent from the mobile device to the output device may include the one-time token. This may prevent a hacker from hijacking the connection after a successful connection between the mobile device and the output device. Thus, a hacker would still need to have the one-time token to send control signals to the output device. The method 200 ends at block 210.

Figure 3:
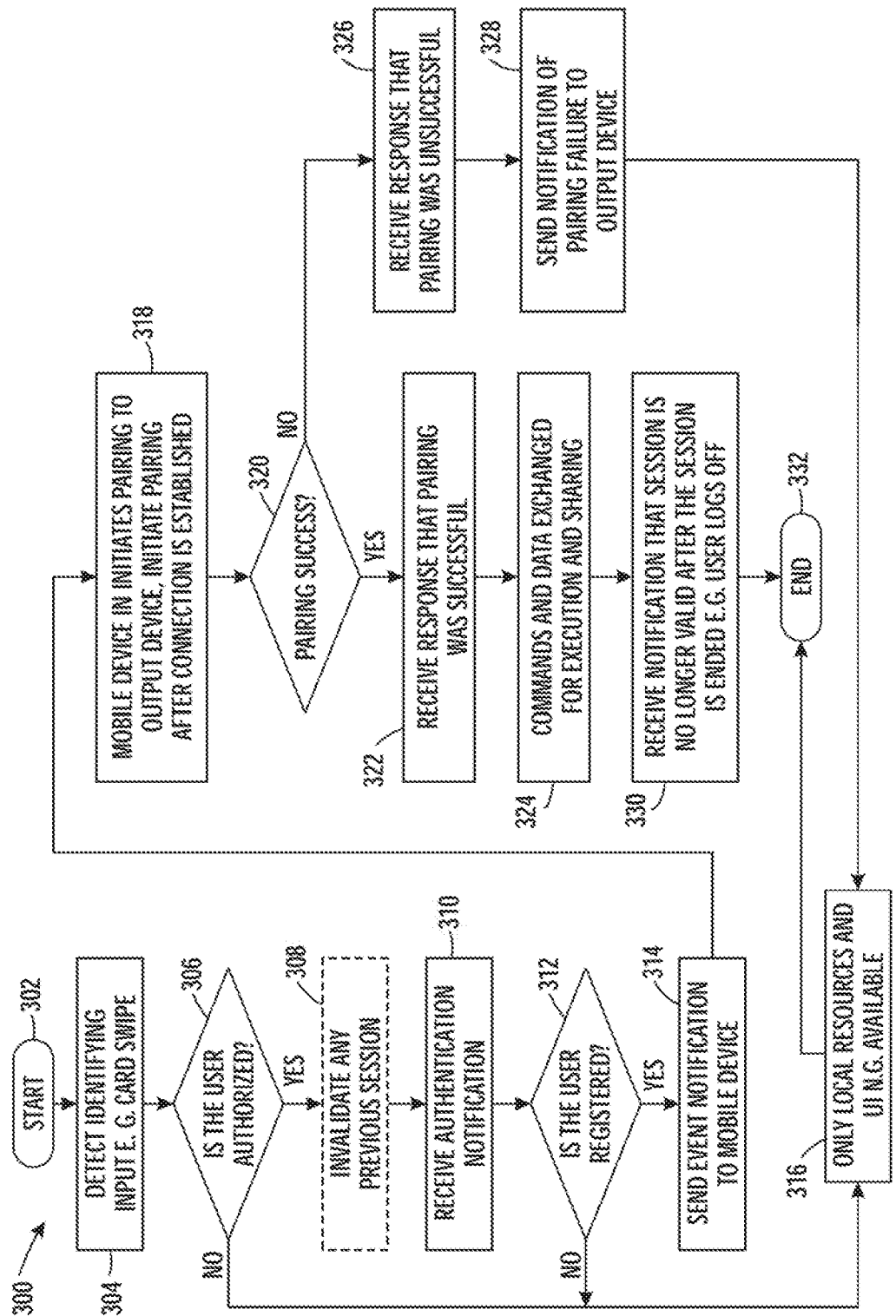
FIG. 3 illustrates an example flowchart of another embodiment of a method for connecting a mobile device and an output device.

FIG. 3 illustrates a flowchart of a method 300 for connecting a mobile device and an output device. In one embodiment, the method 300 may be performed by one of the pairing server 112 or a general-purpose computer as illustrated in FIG. 4 and discussed below.

The method 300 begins at block 302. At block 304, the method 300 may detect identifying information input at the output device 108. For example, a user may approach an output device 108 and swipe his or her access card on a card reader of the output device 108 providing user information.

At block 306, the information obtained by the information reader and identifying the user may be used by an authentication server 110 to determine if the user is authorized to use the output device 108 and which services are available to the user. For example, detecting the card swipe at block 304 may automatically initiate a communication from the output device 108 to the authentication server 110. The authentication server may determine whether the user is authorized to make a direct connection between the output device and a registered mobile device 106.

At optional block 308, the method 300 may invalidate any previous session to ensure security for each session that is created. In other words, in one embodiment, only a single session between a mobile device 106 and the output device 108 may be active at any given time.

At block 310, the method 300 receives an authentication notification from the authentication server 110 to initiate the process to determine if the user is registered for pairing a mobile device 106 to the output device 108. In other words, the authentication server 110 may send a request to the pairing server 112 to initiate a pairing, or connection, processes after the user has been authenticated at block 306. For example, the authentication server 110 may use the information gathered during the registration, as discussed above, to connect to and communicate with the pairing server 112. The authentication server may send information to the pairing server 112, such as who the user is, what output device is being accessed, applicable protocols available, security schemes available, single use session tokens for use in encryption and privacy schemes, authorization tokens to identify any resource restrictions to impose, and the like.

In block 312, the pairing server 112 may determine if the user is registered for direct connection of the output device 108 and a mobile device 106, as discussed above. For example, if the pairing server 112 finds that the user identified by the authentication server 110 is registered, the pairing server 112 may then identify a mobile device 106 that was registered by the user.

If the block 312 determines that the user is not registered, the method 300 may proceed to block 316. At block 316 the user is notified that only the local user interface of the output device 108 is available and the method 300 terminates at block 332.

If it is determined in block 312 that the user is registered, the method 300 may proceed to block 314, wherein the method 300 sends an event notification to the mobile device 106. In one embodiment, the event notification is sent by the pairing server 112. In one embodiment, a software application installed on the mobile device 106 detects the receipt of the event notification.

In one embodiment, the notification may include configuration information that is to be used to establish direct communication between the mobile device 106 and the output device 108. For example, the configuration information may include a unique session identifier that is to be sent with any communication issued by the mobile device 106 to the output device 108 to ensure that the commands are being sent over a valid and current session. The configuration information may also include an encryption key to encrypt communication between the mobile device 106 and the output device 108. As a result, the communication between the mobile device 106 and the output device 108 may be secure.

Communications between the output device 108, the pairing server 112, and the mobile device 106 may be encrypted for security. In one embodiment the connection between the authentication server 110 and the pairing server 112 is encrypted and authenticated. In one embodiment the connection between the mobile device 106 and pairing server 112 is encrypted and authenticated. In one embodiment, the connection between the mobile device 106 and the output device 108 is encrypted and authenticated. For example, at block 310, an encryption key may be included in the authentication notification and forwarded in block 318 to the mobile device 106 to enable encrypted communication between the output device 108 and the mobile device 106. In one embodiment, the encryption key is generated by the output device 208.

At block 318, the mobile device 106 may initiate direct network connection to the output device 108 in response to receipt of the event notification. For example, the mobile device 106 may initiate a Wi-Fi Direct connection with the output device 108. Once the communication channel is established between the mobile device 106 and the output device 108, pairing of the devices may be initiated using identity and access rights information. The information necessary to establish a network connection and to pair the mobile device 106 with the output device 108 may include, but is not limited to, the output device network addresses, available networks, session token, and required security information.

After the connection and pairing processes are initiated in block 318 the method 300 determines the resulting status of the pairing between the output device 108 and the mobile device 106 in block 320.

If the result of block 320 indicates the pairing was not made successfully, the method 300 proceeds to block 326, wherein the method receives a response that the pairing attempt was unsuccessful. In one embodiment, the mobile device 106 sends a response to the pairing server 112 indicating that the pairing between the mobile device 106 and the output device 108 was not successfully completed.

Once the response in block 326 is received the method 300 moves to block 328. In block 328 a notification of the pairing failure is sent to the output device. The method 300 proceeds to block 316 where the user may only use the local resources and user interface of the output device 108. The method 300 then ends at block 332.

If the result of block 320 indicates the pairing was made successfully, the method 300 proceeds to block 322, wherein the method receives a response that the pairing attempt was successful. In one embodiment, the mobile device 106 sends a response to the pairing server 112 indicating that the pairing between the mobile device 106 and the output device 108 was successfully completed. Once the response in block 322 is received the method 300 moves to block 324.

At block 324, the user may interact with the mobile device 106 and the output device 108 by exchanging commands and data between the mobile device 106 and the output device 108. For example, an app installed on the mobile device 106 may be used to print a document on the output device 108. In another example, an app installed on the output device 108 may be used to combine a file stored on the mobile device 106 with a document scanned on the output device 108 and the combined document sent by e-mail to a recipient.

Once the user is finished using the pairing between the mobile device 106 and the output device 108, the pairing may be terminated. In one embodiment the user may end the session by initiating a log out process at the output device 108. In one embodiment, after the user initiates log out at the output device 108, the output device sends a termination message to the mobile device 106. The output device 108 then terminates the pairing with the mobile device 106. In one embodiment the user may end the session by initiating a log out process at the mobile device 106. In one embodiment, after the user initiates log out at the mobile device 106, the mobile device sends a termination message to the output device 108. The mobile device 106 then terminates the pairing with the output device 108.

After the pairing is terminated the output device 108 logs the user off the output device and the pairing server 112 receives notification in block 330 that the communication session is no longer valid. In one embodiment the mobile device informs the pairing server 112 that the pairing has been terminated. The pairing server 112 marks the pairing status between the output device 108 and the mobile device 106 as unpaired. The method 300 ends at block 332 with the output device 108 and the mobile device 106 available for a new pairing session.

It should be noted that although not explicitly specified, one or more blocks, functions, or operations of the methods 200 and 300 described above may include a storing, displaying and/or outputting block as required for a particular application. In other words, any data, records, fields, and/or intermediate results discussed in the methods can be stored, displayed, and/or outputted to another device as required for a particular application. Furthermore, blocks, functions, or operations in FIGS. 2 and 3 that recite a determining operation, or involve a decision, do not necessarily require that both branches of the determining operation be practiced. In other words, one of the branches of the determining operation can be deemed as an optional block.

Figure 4:
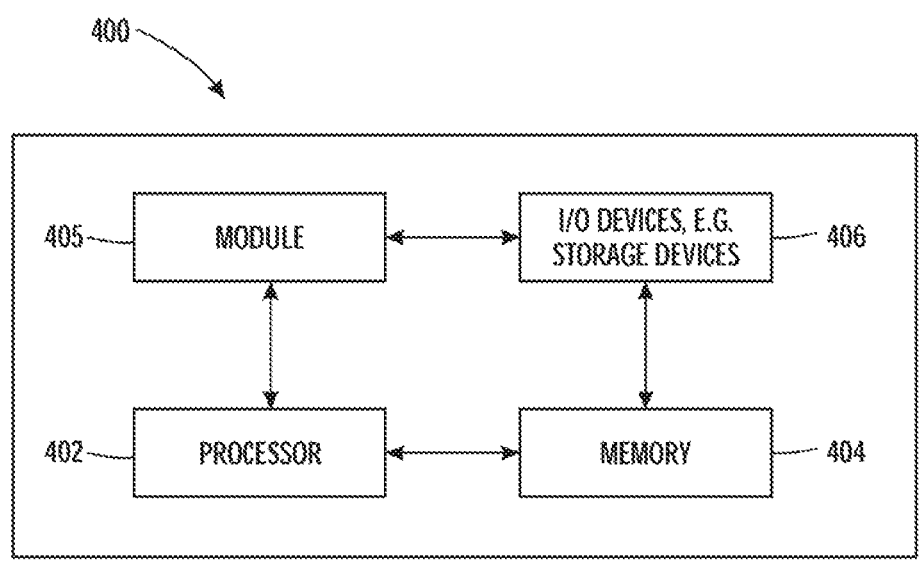
FIG. 4 illustrates a high-level block diagram of a general-purpose computer suitable for use in performing the functions described herein.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for automatically connecting a mobile device and an output device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware deployed on a hardware device, a computer or any other hardware equivalents (e.g., the registration system 102). For example, computer readable instructions pertaining to the method(s) discussed above can be used to configure a hardware processor to perform the blocks, functions and/or operations of the above disclosed methods. In one embodiment, instructions and data for the present module or process 405 for automatically connecting a mobile device and an output device (e.g., a software program comprising computer-executable instructions) can be loaded into memory 404 and executed by hardware processor element 402 to implement the blocks, functions or operations as discussed above in connection with the example methods 200 and 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for automatically connecting a mobile device and an output device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for connecting a mobile device with a multi-function device (MFD), comprising:
receiving, by a processor of a pairing server, a request to connect the mobile device of an authenticated user to the MFD, wherein the MFD is to print, copy, and fax, wherein the receiving is initiated by a card swipe at the MFD that provides authentication credentials from a card;
identifying, by the processor, the mobile device in a database comprising a register of authenticated users and one or more mobile devices of each one of the authenticated users; and
transmitting, by the processor, a configuration information and a connection information to the mobile device, wherein the configuration information causes the mobile device to modify a configuration of the mobile device and automatically connect to the MFD based on the connection information, wherein the configuration information comprises executable instructions to customize a graphical user interface of the mobile device to control the MFD.

2. The method of claim 1, further comprising:
generating, by the processor, a one-time password token; and
transmitting, by the processor, the one-time password token to the MFD and the mobile device to establish a secure connection.

3. The method of claim 1, wherein the user is authenticated by an authentication server before the request is received by the processor of the pairing server.

4. The method of claim 1, wherein the configuration information comprises executable instructions to modify at least one communication parameter on the mobile device to establish a connection between the mobile device and the MFD.

5. The method of claim 1, wherein the configuration information is based on a model of the mobile device.

6. The method of claim 1, wherein the connection information comprises a communication protocol for the mobile device to follow to establish a connection between the mobile device and the MFD.

7. The method of claim 1, wherein the register is predefined by the authenticated users with contact information of each one of the one or more mobile devices to receive the configuration information and the connection information.

8. The method of claim 1, wherein the MFD comprises at least one of: a multi-function device, a printer, or a copier.

9. A non-transitory computer-readable medium storing a plurality of instructions which, when executed by a processor of a pairing server, cause the processor to perform operations for connecting a mobile device with a multi-function device (MFD), the operations comprising:
receiving a request to connect the mobile device of an authenticated user to the MFD, wherein the MFD is to print, copy, and fax, wherein the receiving is initiated by a card swipe at the MFD that provides authentication credentials from a card;
identifying the mobile device in a database comprising a register of authenticated users and one or more mobile devices of each one of the authenticated users; and
transmitting a configuration information and a connection information to the mobile device, wherein the configuration information causes the mobile device to modify a configuration of the mobile device and automatically connect to the MFD based on the connection information, wherein the configuration information comprises executable instructions to customize a graphical user interface of the mobile device to control the MFD.

10. The non-transitory computer-readable medium of claim 9, further comprising:
generating a one-time password token; and
transmitting the one-time password token to the MFD and the mobile device to establish a secure connection.

11. The non-transitory computer-readable medium of claim 9, wherein the user is authenticated by an authentication server before the request is received by the processor of the pairing server.

12. The non-transitory computer-readable medium of claim 9, wherein the configuration information comprises executable instructions to modify at least one communication parameter on the mobile device to establish a connection between the mobile device and the MFD.

13. The non-transitory computer-readable medium of claim 9, wherein the configuration information is based on a model of the mobile device.

14. The non-transitory computer-readable medium of claim 9, wherein the connection information comprises a communication protocol for the mobile device to follow to establish a connection between the mobile device and the MFD.

15. The non-transitory computer-readable medium of claim 9, wherein the register is predefined by the authenticated users with contact information of each one of the one or more mobile devices to receive the configuration information and the connection information.

16. A method for connecting a mobile device with a multi-function device (MFD), comprising:
  detecting, by the MFD, a card swipe to initiate a pairing procedure to connect the mobile device to the MFD, wherein the MFD is to print, copy, and fax;
  authenticating, by an authentication server in communication with the MFD, a user based on authentication credentials received by the MFD from the card swipe;
  receiving, by a pairing server, a request to initiate the pairing procedure after the user is authenticated by the authentication server;
  identifying, by the pairing processor, the mobile device in a database comprising a register of authenticated users and one or more mobile devices of each one of the authenticated users; and
  transmitting, by the pairing server, a configuration information, a connection information to the mobile device;
  transmitting, by the pairing server, a one-time password to the MFD and the mobile device;
  modifying, by the mobile device, a connection parameter and a graphical user interface (GUI) based on executable instructions in the configuration information, wherein the GUI provides controls for the MFD;
  initiating, by the mobile device, a connection with the MFD based on a communication protocol contained in the connection information;
  transmitting, by the mobile device, the one-time password to the MFD; and
  establishing, by the mobile device, the connection with the MFD when the one-time password transmitted by the mobile device matches the one-time password received by the MFD form the pairing device, wherein the connection allows the MFD to access resources on the mobile device.

* * * * *